United States Patent [19]
Katz

[11] 3,852,662
[45] Dec. 3, 1974

[54] PROXIMITY MEASURING EMPLOYING A SELF-BALANCING BRIDGE AND MEASURING THE ADJUSTABLE BALANCING COMPONENT THEREOF

[76] Inventor: Bernard R. Katz, 33 Philip Pl., Irvington, N.J. 07111

[22] Filed: Aug. 2, 1973

[21] Appl. No.: 385,180

Related U.S. Application Data
[63] Continuation of Ser. No. 126,238, March 19, 1971, abandoned.

[52] U.S. Cl. ............ 324/34 PS, 323/75 J, 324/61, 324/65
[51] Int. Cl. ............................................. G01r 33/00
[58] Field of Search ............ 324/34 R, 34 D, 34 PS, 324/34 TK, 40, 61, 65, DIG. 1; 323/75 J, 75 K, 75 L, 75 M, 75 N, 75 P, 21

[56] References Cited
UNITED STATES PATENTS
| | | | |
|---|---|---|---|
| 2,462,599 | 2/1949 | Blumlein et al. | 323/75 M |
| 2,997,648 | 8/1961 | Bozorth | 324/46 |
| 3,431,464 | 3/1969 | Brischnik | 323/21 |
| 3,441,840 | 4/1969 | Randle | 324/34 TK |

FOREIGN PATENTS OR APPLICATIONS
| | | | |
|---|---|---|---|
| 623,711 | 12/1935 | Germany | 324/34 TK |
| 904,689 | 8/1962 | Great Britain | 324/34 D |

OTHER PUBLICATIONS
Ceramic Thickness Gage; Instruments; Vol. 24, June, 1951; pp. 692 and 694.

*Primary Examiner*—Robert J. Corcoran
*Attorney, Agent, or Firm*—Marn & Jangarathis

[57] ABSTRACT

A method of measuring the distance between a target objective and variable impedance sensing means and the apparatus therefor are provided in accordance with the teachings of the present invention. A variable impedance bridge means includes adjustable impedance means and said variable impedance sensing means; the impedance of said variable impedance sensing means being dependent upon the proximity thereto of said target objective. An unbalanced electric condition of said variable impedance bridge means occasioned by a change in the impedance of said variable impedance sensing means is detected and a signal determined by the distance between the target objective and the variable impedance sensing means is produced. Said produced signal is effective to adjust the impedance of said adjustable impedance means whereby a balanced electric condition of said variable impedance bridge means is restored. Impedance measuring means indicates the impedance of said adjustable impedance means and provides a measurement of the distance between said target objective and said variable impedance sensing means.

11 Claims, 6 Drawing Figures

Fig. I.

INVENTOR.
Bernard R. Katz
BY
Marn & Jangarathis
ATTORNEYS

INVENTOR.
Bernard R. Katz

BY *Marn & Jangarathis*

ATTORNEYS

PROXIMITY MEASURING EMPLOYING A SELF-BALANCING BRIDGE AND MEASURING THE ADJUSTABLE BALANCING COMPONENT THEREOF

This is a continuation of application Ser. No. 126,238, filed Mar. 19, 1971 and now abandoned.

This invention relates to proximity sensing methods and the apparatus therefor and, in particular, to a method of and the apparatus for measuring the proximity of a target objective to a variable reactance sensing means.

The desirability of ascertaining the relative separation between an object and a reference is common to many applications such as industrial processing techniques, quantitative analyses, switching devices, and the like. Methods heretofore employed to determine such separation rely principally on visual observation. An attendant disadvantage of such prior art methods is the requirement of a skilled operator or technician, and the high cost of precise optical systems employed to carry out those methods. Further, the benefits attributable to remote indications of the distance between an object and a reference are sharply curtailed by the imposition of direct observations. Accordingly, elementary electrical systems have been introduced to indicate the proximity of an object to a reference. These systems, however, fail to provide the accuracy demanded by precise measurements and are capable of indicating only when the object is within a predetermined range. Other systems necessitate continual manual adjustment and readjustment of measuring paramotors to perform the desired functions. Still other proximity sensing systems introduce large errors due to the inherent properties of the electrical circuits therein, which circuits are utilized to measure the proximity of the object.

Therefore, it is an object of the present invention to provide a simplified method of and inexpensive apparatus for proximity measuring wherein remote indications are obtainable.

It is another object of the present invention to provide a method of automatically adjusting proximity measuring parameters and the apparatus therefor.

It is a further object of the present invention to provide a method of continuously indicating the relative distance between an object and a reference and the apparatus therefor.

Various other objects and advantages of the invention will become clear from the following detailed description of an embodiment thereof, and the novel features will be particularly pointed out in connection with the appended claims.

In accordance with this invention, a method of measuring the separation between an object and a reference, and the apparatus therefor, are provided wherein the reference comprises variable impedance sensing means includable in a variable impedance bridge means; electrical properties of said object are adapted to influence the impedance of said variable impedance sensing means in accordance with the proximity thereto of said object, thereby disturbing a blanced electrical condition of said variable impedance bridge means, the balanced electrical condition of said variable impedance bridge means is restored by automatically adjusting adjustable impedance means includable in said variable impedance bridge means; and the impedance of said adjustable impedance means is a function of the separation between said object and said variable impedance sensing means.

The invention will be more clearly understood by reference to the following detailed description of exemplary embodiments thereof in conjunction with the accompanying drawings in which.

Figure 1:
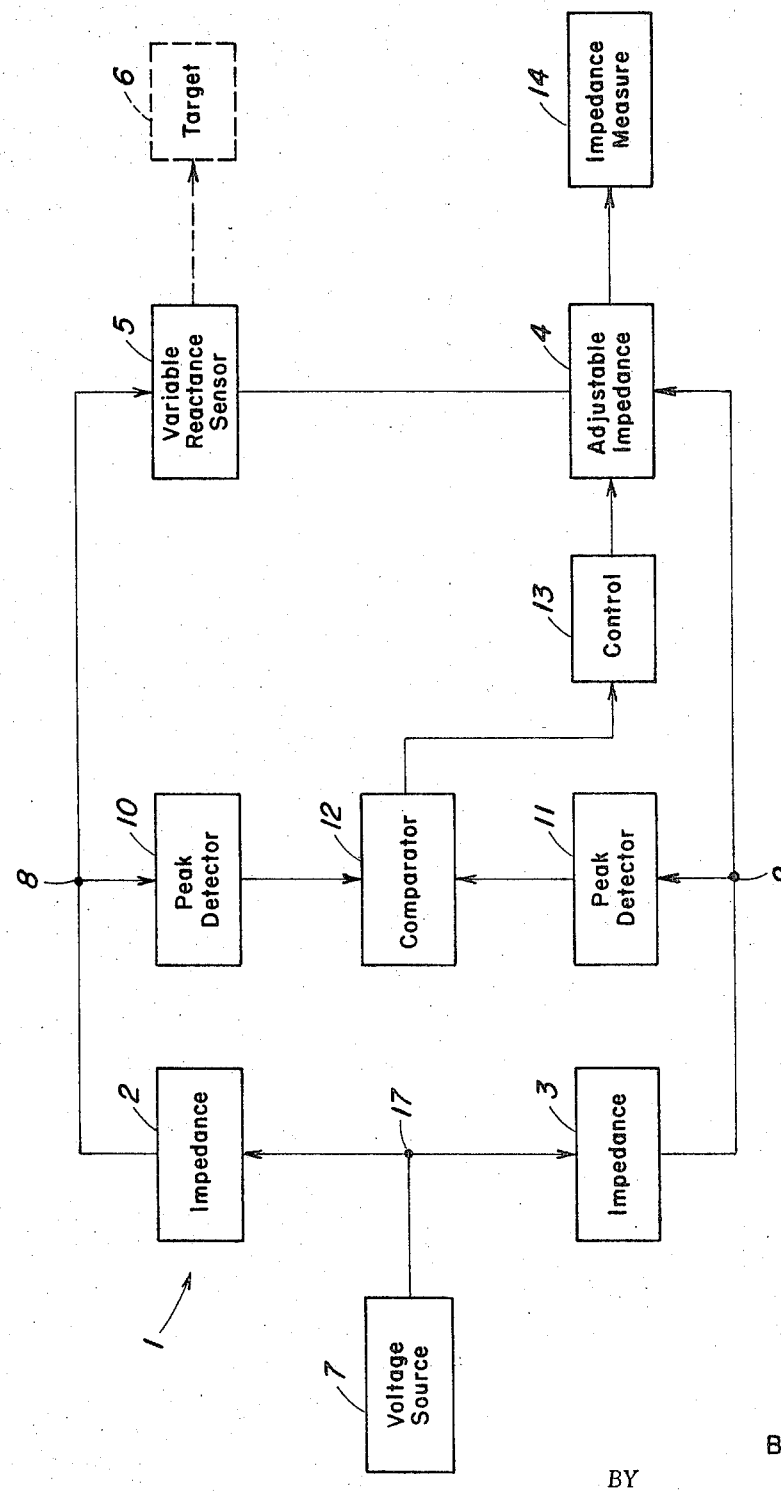
FIG. 1 is a block diagram of an embodiment of the present invention.

Referring now to the drawings, and in particular to FIG. 1, there is illustrated a block diagram of an embodiment of the present invention which comprises variable impedance bridge means 1, target objective 6 and excitation source 7. Variable impedance bridge means 1 comprises fixed impedances 2 and 3, adjustable impedance means 4 and variable impedance sensing means 5. The variable impedance bridge means may assume the recognizable configuration wherein fixed impedance means 2 and 3 are coupled in series relationship having common junction 17 therebetween. Fixed impedance means 2 and 3 may comprise conventional passive circuit elements such as resistance, capacitance or inductance, having a fixed value of impedance that does not vary with time. Excitation source 7, which may comprise an a.c. voltage source, preferably of radio frequency, is coupled to junction 17 and provides a bridge supply voltage thereat. Adjustable impedance means 4 is connected in series to fixed impedance means 3 at junction 9. Adjustable impedance means 4 is adapted to vary the impedance thereof in accordance with control signals applied thereto. An adjustable impedance that has been employed with satisfactory results comprises a photoresistive cell, which may consist of cadmium sulfide, cadmium selenide, or the like, having a resistance that varies with the intensity of light impingent thereon, and a light emitting diode optically coupled to the photoresistive cell and capable of omitting light radiation having an intensity that is a function of an applied voltage.

As shown in FIG. 1, variable impedance sensing means 5 is coupled to fixed impedance means 2 and adjustable impedance means 4 and forms a series circuit therewith The common junction of fixed impedance means 2 and variable impedance sensing means 5 is identified as junction 8. It will soon be seen that junctions 8 and 9 comprise the output terminals of variable impedance bridge means 1. Variable impedance sensing means 5 is adapted to have an impedance that is dependent upon the relative proximity of target objective 6. One skilled in the art will understand that "impedance" generally includes a resistance component and a reactance component, and the reactance component might comprise inductive reactance or capacitive reactance. Hence, as the resistance or reactance of variable impedance sensing means 5 varies, the impedance thereof varies. It is appreciated that if variable impedance sensing means 5 comprises, for example, a magnetization inductance coil, the inductance of said coil, and therefore the impedance thereof, is a function of the distance between said coil and an electrically conductive material. Thus, if target objective 6 includes a surface of electrically conductive material such as ferromagnetic material, the inductance of variable impedance sensing means 5 is dependent upon the distance between the magnetization inductance coil and the ferromagnetic material. Likewise, if the magnetization inductance coil comprises an eddy current probe, the resistance component thereof varies as a function of the distance between the probe and non-ferromagnetic material. Similarly, if variable impedance sensing means 5 comprises a first plate of a parallel plate capacitance means, the capacitance of the parallel plate capacitance means is proportional to the distance between the two parallel plates thereof. Thus, variable impedance sensing means 5 may be formed of electrically conductive material of rectangular configuration and coupled to junction 8. Target objective 6 may comprise the second plate of said parallel plate capacitance means and may include a surface of electrically conductive material, parallel to and spaced from variable impedance sensing means 5, and coupled to adjustable impedance means 4. Hence, the impedance of the parallel plate capacitance means comprised of variable impedance sensing means 5 and target objective 6 is dependent upon the spacing therebetween.

The circuit coupled to junctions 8 and 9 may comprise a well-known peak-to-peak voltmeter adapted to measure the voltage difference between the positive and negative peaks of a voltage potential across junctions 8 and 9 and to apply the results of the measurement to adjustable impedance means 4. Accordingly, peak detecting means 10 is coupled to junction 8 to provide a representation of the negative (or positive) peak of the voltage potential at junction 8. Peak detecting means 11 is coupled to junction 9 to provide a representation of the positive (or negative) peak of the voltage potential at junction 9. Peak detecting means 10 and 11 may comprise well-known peak voltage detecting means, subsequently described. Comparison means 12 is coupled to peak detecting means 10 and 11 respectively, and is adapted to indiate a difference in the representations provided by the latter circuits. Comparison means 12 may comprise a conventional differential amplifier or the like. The output of comparison means 12 is coupled to control means 13 which is capable of producing a control signal upon which the impedance of adjustable impedance means 4 depends. Consequently, control means 13 may comprise an amplifier having a negligible offset voltage. Thus, a control signal applied to adjustable impedance means 4 by control means 13 is proportional to the difference in magnitudes of the voltage potentials appearing at junctions 8 and 9, respectively.

Impedance measuring means 14 is coupled to adjustable impedance means 4 and may comprise any well-known impedance measuring device such as an ohmeter, Kelvin Bridge circuit or the like. If adjustable impedance means 4 comprises a photoresistive cell in light communication with a light emitting diode, impedance measuring means 14 is adapted to measure the resistance of the photoresistive cell or, conversely, the conductance of the photoresistive cell.

Operation of the block diagram of FIG. 1 will now be described. One skilled in the art will recognize that the product of the impedances of opposite arms of a balanced bridge circuit are equal. Hence, if the impedance of fixed impedance means 2 is represented as $Z_2$, the impedance of fixed impedance means 3 is represented as $Z_3$, the impedance of adjustable impedance means 4 is represented as $Z_4$, and the impedance of variable impedance sensing means 5 is represented as $Z_5$, then $Z_3 Z_5 = Z_2 Z_4$ and $Z_5 = (Z_2/Z_3) Z_4$. Further, if the impedance of fixed impedance means 2 is equal to the impedance of fixed impedance means 3, then $Z_5 = Z_4$ when variable impedance bridge means 1 obtains a balanced electrical condition.

It is understood from the foregoing explanation that the impedance of variable impedance sensing means 5 is dependent upon the proximity thereto of target objective 6. Hence, variable impedance sensing means 5 senses the the proximity of target objective 6 which causes the impedance of variable impedance sensing means 5 to change accordingly, It will first be assured that variable impedance sensing means 5 comprises a magnetization inductance coil and target objective 6 comprises electrically conductive material. When variable impedance sensing means 5 is energized by the coupling of excitation source 7 to junction 17, a magnetic field is generated by variable impedance sensing means 5 and eddy currents are induced in target objective 6. The magnitude of the induced eddy currents is a function of the distance between variable impedance sensing means 5 and target objective 6. The eddy currents produce a magnetic field which opposes the magnetic field generated by variable impedance sensing means 5, resulting in a decreased effective magnetic field and causing the impedance of the variable impedance sensing means 5 to change in a corresponding manner. If target objective 6 is comprised of nonferromagnetic material, the change in the impedance of variable impedance sensing means 5 is predominantly resistive. If, however, target objective 6 is comprised of a ferromagnetic material, the change in the impedance of variable impedance sensing means 5 is predominantly inductive.

Those skilled in the impedance bridge art will recognize that when the impedance of variable impedance sensing means 5 is changed, the balanced electric condition of variable impedance bridge means 1 is disturbed. Adopting conventional terminology, the impedance of variable impedance sensing means 5 may be considered the unknown impedance and the impedance of adjustable impedance means 4 may be modified to restore the balanced electrical condition. It is recalled that when the variable impedance bridge means 1 obtains the balanced electric condition, $Z_5 = Z_4$ and the impedance of variable impedance sensing means 5 is equal to the impedance of adjustable impedance means 4. Consequently, if the impedance of adjustable impedance means 4 is known or obtainable, the spacing between variable impedance sensing means 5 and the target objective 6, upon which the impedance of variable impedance sensing means 5 depends, may be determined. The balanced electric condition of variable impedance bridge means 1 is restored by the apparatus illustrated in FIG. 1 without the assistance of a technician or operator, in the manner now described.

The changed impedance of variable impedance sensing means 5, occasioned by the proximity thereto of target objective 6, results in a voltage potential appearing across junctions 8 and 9, which are recognized as the output terminals of variable impedance bridge means 1. If excitation source 7 provides an a.c. signal to junction 17, which is recognized as the input terminal of variable impedance bridge means 1, the voltage potential appearing at junction 8 is an a.c. voltage, the voltage potential appearing at junction 9 is an a.c. voltage, and the voltage potential therebetween is an a.c. voltage. Peak detecting means 10 responds to the negative (positive) peak amplitude obtained by the voltage potential appearing at junction 8 and provides a representation of said peak amplitude. Similarly, peak detecting means 11 responds to the positive (negative) peak amplitude obtained by the voltage potential appearing at junction 9 and provides a representation thereof. It should be understood that the representations provided by peak detecting means 10 and 11 may be a.c. voltage levels, d.c. voltage levels, phase shifts, or other quantities compatible with comparison means 12. If comparison means 12 is a conventional differential amplifier, an output signal proportional to the difference in magnitudes of voltage levels provided by peak detecting means 10 and 11, respectively, is generated. If comparison means 12 is a conventional phase comparator, an output signal proportional to the difference in the phases of the signals provided by peak detecting means 10 and 11, respectively, is generated. The output signal generated by comparison means 12 is a direct indication of the unbalanced electric condition of the variable impedance bridge means 1. The magnitude of the output signal is proportional to the change in separation between variable impedance sensing means 5 and target objective 6, and the phase or polarity of the output signal indicates the direction of change. The control signal produced by control means 13 in response to the output signal applied thereto by comparison means 12 may be a multiple of said output signal, preferably having a slowly varying magnitude. The impedance of adjustable ipedance means 4 is adjusted in accordance with said control signal to restore the variable impedance bridge means 1 to the balanced electric condition. Thus, it is seen that comparison means 12, control means 13 and adjustable impedance means 4, in combination, function as a negative feedback control system to obtain a balanced electric condition of variable impedance bridge means 1. Hence, the impedance of adjustable impedance means 4 tends to correspond to the impedance of variable impedance sensing means 5 and $Z_4 = Z_5$. Thus, the voltage potential appearing at junction 8 is now equal to the voltage potential appearing at junction 9. The representation provided by peak detecting means 10 is equal to the representation provided by peak detecting means 11 and the output signal generated by comparison means 12 is reduced to a null value. Consequently, control means 13 does not apply a control signal to adjustable impedance means 4 and the impedance of the latter means remains unchanged. Thus, the impedance of adjustable impedance means 4 is equal to the impedance of variable impedance sensing means 5, and a measure of the impedance of the former is a measure of the impedance of the latter. Since the impedance of variable impedance sensing means 5 is dependent upon the proximity thereto of target objective 6, impedance measuring means 14 may be calibrated in units representing distance to thereby provide a direct indication of the separation between target objective 6 and variable impedance sensing means 5.

It is apparent that the control siganl supplied by control means 13 may modulate the intensity of light communicated from a light emitting diode to a photoresistive cell.

Although the foregoing has described the operation of the apparatus of FIG. 1 for the exemplary embodiment of variable impedance sensing means 5 comprising a magnetization inductance coil, it is readily apparent that such description is applicable to the embodiment wherein variable impedance sensing means 5 comprises a first plate of a parallel plate capacitance means. One skilled in the art will recognize that the impedance of a capacitor is proportional to the capacitance thereof; and the capacitance of a parallel plate capacitor may be represented as:

$$C = K(A/D)$$

wherein $C$ is the capacitance of the parallel plate capacitor, $K$ represents the dielectric coefficient of the medium interposed between the parallel plates, $A$ is the area of each parallel plate and $D$ is the separation between the parallel plates. Hence, as the spacing between variable impedance sensing means 5 and target objective 6 is altered, the impedance of the parallel plate capacitance means comprised of variable impedance sensing means 5 and target objective 6 is correspondingly changed, thereby producing an unbalanced electric condition of the variable impedance bridge means 1. The impedance of adjustable impedance means 4 is modified in the aforedescribed manner to restore the variable impedance bridge means 1 to its balanced electric condition. Accordingly, the impedance of adjustable impedance means 4 is now equal to the impedance of the parallel plate capacitance means comprised of variable impedance sensing means 5 and target objective 6, which latter impedance is proportional to the spacing therebetween. Consequently, the impedance measuring means 14, which measures the impedance of adjustable impedance means 4, may be calibrated in units representing the distance between variable impedance sensing means 5 and target objective 6; and a direct indication of the separation therebetween may be obtained.

The advantages offered by the present invention are now evident. Variable impedance sensing means 5 may be disposed at a location remote from the remainder of the apparatus of FIG. 1, thereby enabling precise measurements at emplacements heretofore inaccessible. Thus, it is seen that displacements of variables of industrial process may be ascertained. The nature of the apparatus of FIG. 1 admits of portable applications, such as determining the relative proximity of metallic objects. Various other applications should now appear obvious to those skilled in the art.

Figure 2:
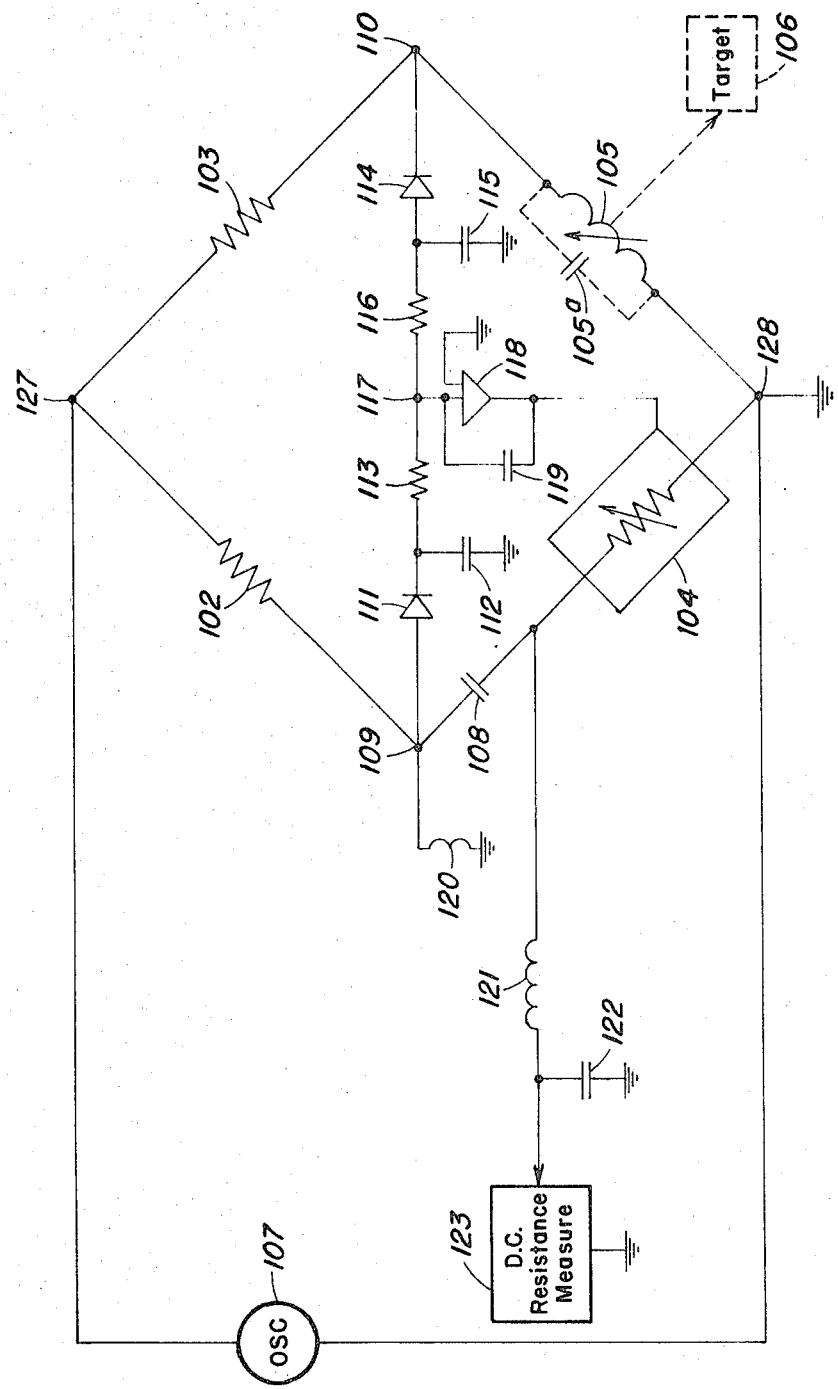
FIG. 2 is a schematic diagram of an embodiment of the present invention.

A more detailed diagram of an embodiment of the present invention is shown in schematic form in FIG. 2 which comprises resistance means 102 and 103, adjustable resistance means 104, variable inductance means 105, target objective 106, rectifying means 111 and 114, capacitance means 112 and 115 and amplifying means 118. Resistance means 102 and 103 may each comprise a commercially available resistor having a high tolerance, such as a precision metal film resistor. One end of each resistance means 102 and 103 is connected in common to first input terminal 127. The other end of each resistance means 102 and 103 is connected to output terminal 109 and 110, respectively. A second input terminal 128 is connected in common to adjustable resistance means 104 and variable inductance means 105. Adjustable resistance means 104 is represented by the conventional notation for a variable resistor; however, it is apparent that adjustable resistance means 104 may comprise a conventional photoresistive cell in light communication with a light emitting diode. Adjustable resistance means 104 is coupled to output terminal 109 via series connected d.c. blocking capacitance means 108. Variable inductance means 105 may comprise an inductive probe or magnetization inductance coil, characterized by an impedance including an inductive component and a resistive component. Variable inductance means 105 is adapted to generate a magnetic field upon being supplied with an energizing current. Accordingly, variable inductance means 105 corresponds to aforementioned variable impedance sensing means 5 of FIG. 1. Thus, the inductance of variable inductance means 105 is dependent upon the proximity thereto of ferromagnetic material and the resistance of variable inductance means 105 is dependent upon the proximity thereto of nonferromagnetic material. As is appreciated, target objective 106 may include a surface of ferromagnetic or nonferromagnetic material and the inductance or resistance of variable inductance means 105 is proportional to the interstice between target objective 106 and variable inductance means 105. Coupling capacitance 105a is represented in broken lines as connected in parallel to variable inductance means 105 and comprises the capacitance coupling inherent in the coils that comprise variable inductance means 105. Although negligible, capacitance 105a is a factor conributing to the impedance of varaible inductance means 105 and tends to characterize the resonant frequency thereof. Variable inductance means 105 is connected to output terminal 110 as illustrated in FIG. 2. Thus, it is seen that a variable impedance bridge circuit is formed comprising a first network branch connected between input terminal 127 and output terminal 110 and including fixed resistance means 103, a second network branch connected between input terminal 127 and output terminal 109 and including fixed resistance means 102, a third network branch connected between input terminal 128 and output terminal 110 and including variable inductance means 105 and a fourth network branch connected between input terminal 128 and output terminal 109 and including adjustable resistance means 104. The variable impedance bridge circuit thus formed is adapted to be energized by coupling input terminals 127 and 128 to a source of radio frequency energy such as oscillator 107.

Conventional impedance bridge circuits employ detecting means to sense an unbalanced potential conduction of the impedance bridge. Detecting means in accordance with the present invention senses an unbalanced potential condition of the variable impedance bridge circuit and tends to restore a balanced potential condition thereto. A positive peak detecting circuit is coupled to output terminal 109 and comprises a half wave rectifying means 111 in shunt relationship with low pass filter capacitor 112. Half wave rectifying means 111 may comprise a semiconductor diode having an anode connected to output terminal 109 and a cathode connected to low pass filter capacitor 112. The low pass filter capacitor 112 is a by-pass capacitor providing a low frequency path to ground for radio frequency currents. A negative peak detecting circuit is coupled to output terminal 110 and comprises half wave rectifying means 114 in shunt relationship with low pass filter capacitor 115. Half wave rectifying means 114 may comprise a semiconductor diode, matched to diode 111, having a cathode connected to output terminal 110 and an anode connected to low pass filter capacitor 115, the latter functioning as a by-pass capacitor. Resistance means 113 has one end thereof connected to the common connection of half wave rectifying means 111 and capacitor 112, and resistance means 116 has one end thereof connected to the common connection of half wave rectifying means 114 and capacitor 115. The other ends of resistance means 113 and 116 are connected in common to junction 117.

Amplifying means 118 may comprise a high gain operational amplifier having high input impedance. It is preferable to provide zero offset voltage for amplifying means 118 and accordingly, amplifying means 118 is provided with feedback capacitor 119 to form an integrating circuit. One skilled in the art will recognize that the input resistance to amplifying means 118 comprises the parallel combination of resistance means 113 and 116 because resistance means 113 and 116 are coupled to ground via radio frequency by-pass capacitors 112 and 115, respectively. Hence, if resistance means 113 has a value of resistance equal to $R_{113}$ and resistance means 116 has a value of resistance equal to $R_{116}$ then the input resistance of amplifying means 118 is equal to $(R_{113}R_{116}) / (R_{113} + R_{116})$. The gain of the integrating circuit comprised of amplifying means 118 and feedback capacitor 119 is $(R_{113} + R_{116}) /R_{113}R_{116}C_{119}$, where $C_{119}$ is the value of capacitance of feedback capacitor 119. The output of amplifying means 118 is coupled to adjustable resistance means 104 and is adapted to supply the voltage upon which the resistance of adjustable resistance means 104 depends.

It is understood that the presence of the peak detecting means results in undesirable d.c. signals that might have an unpredictable and deleterious affect on the adjustable resistance means 104 and d.c. resistance measuring means 123 coupled to adjustable resistance means 104. Hence, radio frequency choke coil 120 is coupled to output terminal 109 to provide a low impedance path to ground for the d.c. signals that might be present at said output terminal, but a high inpedance path to ground for the radio frequency signals appearing at output terminal 109. The d.c. blocking capacitance means 108 is adapted to further inhibit the d.c. signals present at output terminal 109 from affecting the d.c. resistance measuring means 123. A low impedance path to ground is provided for the d.c. signals that might be present at output terminal 110 by variable inductance means 105. Accordingly, a ground reference is provided at input terminal 128.

It is preferred to measure the d.c. resistance of adjustable resistance means 104 to ascertain the proximity of target objective 106 to variable inductance means 105 because it is the d.c. resistance that is adjusted in accordance with the output of amplifying means 118. The d.c. resistance measuring means 123 is coupled to adjustable resistance means 104 via a conventional radio frequency decoupling network comprised of radio frequency choke coil 122 connected in shunt relationship with by-pass capacitor 122. Consequently, the radio frequency signals provided by energization source 107 that flow through the variable impedance bridge circuit are isolated from d.c. resistance measuring means 123 by the high impedance presented by radio frequency choke coil 121 and by-pass capacitor 122. The d.c. resistance measuring means 123 corresponds to impedance measuring means 14 of FIG. 1 and may comprise a conventional d.c. resistance measuring device well known to those skilled in the art whereby a precise measurement of the d.c. resistance of adjustable resistance means 104 may be obtained.

To facilitate explanation of the operation of FIG. 2, reference will be made to FIGS. 3A–3C which represent signal waveforms that may be produced at various locations of the apparatus of FIG. 2. It will be assumed, for purposes of this description, that the value of resistance of resistance means 102 is equal to the value of resistance of resistance means 103. Thus, it is seen from the well--known impedance bridge equations for a balanced impedance bridge, the impedance of the network branch connected between input terminal 128 and output terminal 110 is equal to the impedance of the network branch connected between input terminal 128 and output terminal 109. The value of the capacitance of d.c. blocking capacitance means 108 may be selected to provide a very low impedance path for the radio frequency signals present in the network branch connected between input terminal 128 and output terminal 109. Accordingly, the effective impedance of the latter network branch is determined by the resistance of adjustable resistance means 104. The effective impedance of the network branch connected between input terminal 128 and output terminal 110 is equal to the inductive reactance of variable inductance means 105 in combination with the series resistance of the windings of the magnetization inductance coil or eddy current probe that might comprise the variable inductance means 105, and the inherent coupling capacitance 105a. Although not necessary for the satisfactory operation of the present invention, the frequency of oscillator 107 and the self-inductance of variable inductance means 105 may be specifically adopted whereby the frequency of energization supplied to input terminals 127 and 128 is the resonant frequency of the variable inductance means 105. At the resonant frequency thereof the impedance of the network branch connected to input terminal 128 and output terminal 110 is effectively resistive. Hence, when the variable impedance bridge circuit obtains a balanced potential condition and target objective 106 is not in proximity to variable inductance means 105 to affect the impedance thereof, the resistance of adjustable resistance means 104 as measured by d.c. resistance measuring means 123 is equal to the impedance of variable inductance means 105.

Figure 3A:
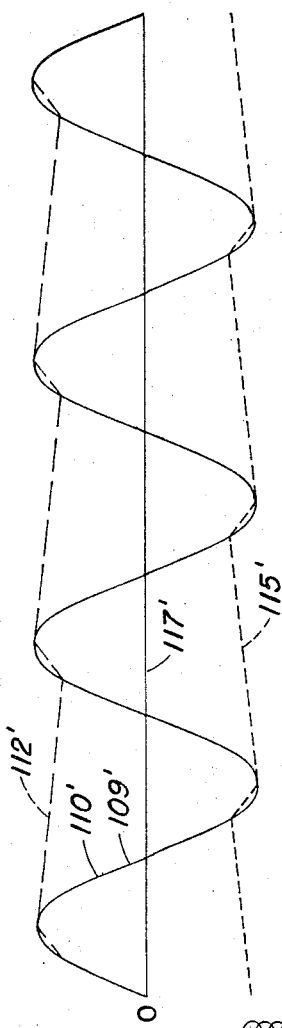
FIGS. 3A–3C are graphical representations of voltage waveforms present at various locations of the schematic diagram of FIG. 2.
Figure 3B:
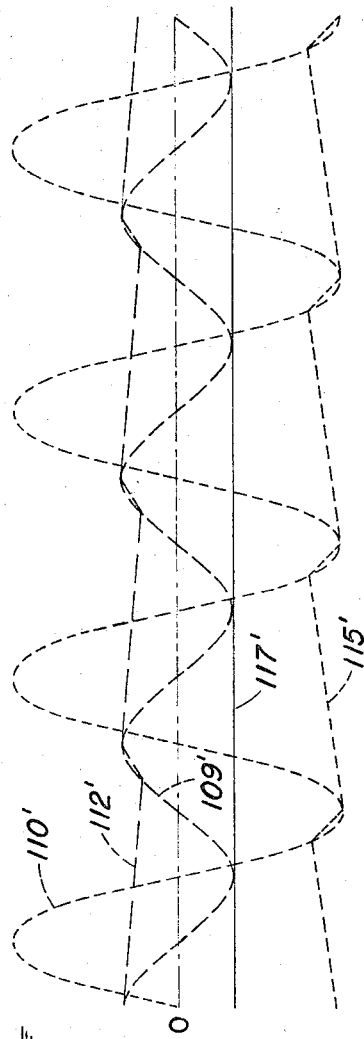
Figure 3C:
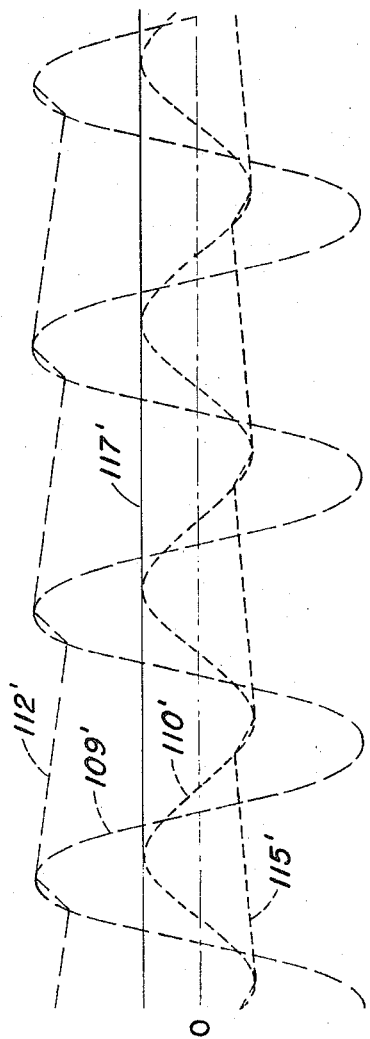

Reference is made to FIG. 3A to describe the voltage waveforms present in the variable impedance bridge circuit at this time. Since the bridge circuit admits of a balanced potential condition and the effective impedance of variable inductance means 105 is equal to the resistance of adjustable resistance means 104, the voltage waveform 110' at output terminal 110 is equal to and in phase with the voltage waveform 109' at output terminal 109. Half wave rectifying means 111 applies the positive portion of waveform 109' to capacitor 112 enabling capacitor 112 to charge to the positive peak value of waveform 109'. Inherent leakage resistance of capacitor 112 results in slight leakage current therefrom and the voltage thereacross decays as illustrated by waveform 112' until the voltage waveform 109' assumes a value equal to the instantaneous value of waveform 112'. It should be understood that the filtering of the waveform 109' by capacitor 112 after rectification by half wave rectifying means 111 is effective to supply resistance means 113 with a positive d.c. signal having minimal ripple factor. Half wave rectifying means 114 applies the negative portion of waveform 110' to capacitor 115, enabling capacitor 115 to charge to the negative peak value of waveform 110'. Capacitor 115 is similar to capacitor 112 and the inherent leakage resistance thereof causes the voltage thereacross to decay as illustrated by waveform 115'. When the instantaneous value of waveform 110' is equal to the instantaneous value of waveform 115', capacitor 115 again charges to the negative peak value of waveform 110'. Capacitor 115, which functions as a filter capacitor, supplies resistance means 116 with a negative d.c. signal having a minimal ripple factor.

Waveforms 112' and 115' are algebraically combined by resistance means 113 and 116 whereby the sum of waveforms 112' and 115' is manifested by waveform 117' at junction 117. It is seen that for a balanced potential condition of the variable impedance bridge circuit, waveform 112' is substantially equal to and opposite waveform 115' whereby the value of waveform 117' is essentially zero. The integrating circuit comprised of amplifying means 113 and feedback capacitor 119 integrates waveform 117' and applies a slowly varying signal to adjustable resistance means 104. Accordingly, the voltage dependent resistance of adjustable resistance means 104 is not adjusted.

Let it now be assumed that target objective 106 is disposed in the vicinity of variable inductance means 105 and spaced therefrom at an unknown distance. It is recognized that if target objective 106 includes ferromagnetic material, the inductance component of variable inductance means 105 is altered in accordance with the interstice between variable inductance means 105 and the target objective 106. Similarly, if target objective 106 includes nonferromagnetic material, the resistance component of variable inductance means 105 is altered in accordance with said interstice. Hence, the impedance of the network branch connected to input terminal 128 and output terminal 110 is changed. The previously assumed balanced potential condition of the variable impedance bridge circuit is disturbed by the variations of the impedance of variable inductance means 105 and, referring to FIG. 3B, the voltage waveform 110' at output terminal 110 is observed to be greater in magnitude than the voltage waveform 109' at output terminal 109. In addition, the phase relationship between waveforms 110' and 109' is altered. The maximum value obtained by waveform 109' is detected by the peak detecting means coupled to output terminal 109 and capacitor 112 produces a waveform 112' in response thereto. Similarly, the minimum value obtained by waveform 110' is detected by the peak detecting means coupled to output terminal 110 and capacitor 115 produces waveform 115'. It is seen that the present example has assumed that the negative voltage produced by capacitor 115 is greater than the positive voltage produced by capacitor 112. Hence, the algebraic combination of waveforms 115' and 112' by resistance means 116 and 113 results in a negative waveform 117' at junction 117. Waveform 117' is an indication of the unbalanced potential condition of the variable impedance bridge circuit such that the magnitude of waveform 117' is a function of the distance between variable inductance means 105 and target objective 106. The voltage at junction 117, represented by waveform 117', is integrated by the integrating circuit comprised of amplifying means 118 and feedback capacitor 119 to supply adjustable resistance means 104 with a slowly varying voltage that is a function of the distance between variable inductance means 105 and target objective 106. The resistance of adjustable resistance means 104 is adjusted in accordance with the slowly varying voltage supplied thereto such that said slowly varying voltage is minimized. If adjustable resistance means 104 comprises a photoresistive cell in light communication with a light emitting diode, the slowly varying voltage may be utilized to modulate the intensity of the light emitted by said light emitting diode. It is, of course, understood that a null voltage is supplied by the integrating circuit when a balanced potential condition is restored to the variable impedance bridge circuit. At that time the resistance of adjustable resistance means 104 is equal to the impedance of variable inductance means 105. by an indication bh d.c. resistance measuring means 123 of the resistance of adjustable resistance means 104 is an indication of the impedance of variable inductance means 105. The d.c. resistance measuring means 123 may be calibrated in units representing distance to thereby present a direct measurement of the spacing between variable inductance means 105 and target objective 106.

If, now, the relative position of target objective 106 is changed, the impedance of variable inductance means 105 is proportionately varied and the balanced potential condition of the variable impedance bridge circuit is disturbed. The voltage potential waveform at output terminal 109 might now be represented by waveform 109' of FIG. 3C which is greater in magnitude than the voltage potential waveform 110' at output terminal 110. Since the impedance of variable inductance means 105 has been changed, it is expected that the phase relationship between waveform 109' and waveform 110' will also change. Resistance means 113 is supplied with waveform 112' produced by capacitor 112 and representative of the maximum value obtained by waveform 109'. Similarly, resistance means 116 is provided with waveform 115' by capacitor 115. The latter waveform is representative of the minimum value obtained by waveform 110'. Accordingly, the peak values of waveforms 109' and 110' are compared by the algebraic summation of waveforms 112' and 115' effected by resistance means 113 and 116. The resultant waveform 117' at junction 117 is indicative of the unbalanced potential condition of the variable impedance bridge circuit and, accordingly, the magnitude of waveform 117' is a function of the distance between variable inductance means 105 and target objective 106. The integrating circuit comprised of amplifying means 116 and feedback capacitor 119 integrates the voltage at junction 117 to supply adjustable resistance means 104 with a slowly varying voltage corresponding to said distance between variable inductance means 105 and target objective 106. The resistance of adjustable resistance means 104 is adjusted in accordance with the slowly varying voltage supplied thereto whereby a balanced potential condition of the variable impedance bridge circuit is restored. Consequently, the slowly varying voltage supplied by the integrating circuit is minimized. It should be understood that when the balanced potential condition is restored to the variable impedance bridge circuit the magnitude of the voltage potential waveform 109' is equal to the magnitude of the voltage potential waveform 110', although the phase of waveform 109' need not be equal to the phase of waveform 110'. However, the voltages provided by capacitors 112 and 115 are not responsive to phase displacements of the voltage potential waveforms 109' and 110', respectively, and waveform 112' will be substantially equal to and opposite waveform 115'. Hence, the magnitude of waveform 117' will be essentially zero. The resistance of adjustable resistance means 104, as indicated by d.c. resistance measuring means 123, is recognized as a direct measurement of the spacing between variable inductance means 105 and target objective 106. It is appreciated that the resistance of adjustable resistance means 104 is continuously modified until a balanced condition of the variable impedance bridge circuit obtains. Accordingly, the indication of the spacing between variable inductance means 105 and target objective 106 as presented by d.c. resistance measuring means 123 is not an absolute measurement until said balanced potential condition obtains.

Figure 4:
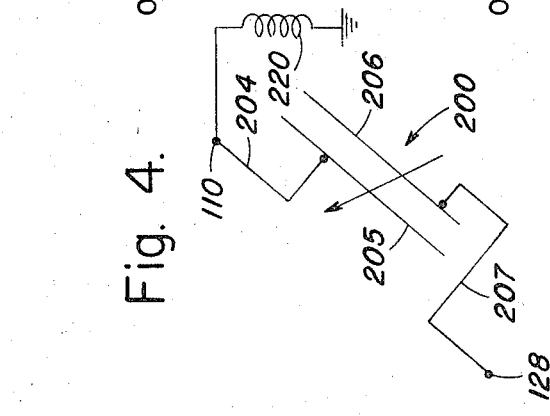
FIG. 4 is a schematic diagram of a portion of another embodiment of the present invention.

The present invention admits of a further embodiment wherein variable inductance means 105 may be replaced by variable capacitance means 200 as represented by FIG. 4. A first plate 205 formed of electrically conductive material may be connected to output terminal 110 by conducting lead 204 and a second plate 206 formed of electrically conductive material may be connected to input terminal 128 by conducting lead 207. Second plate 206 corresponds to aforementioned target objective 106 and is parallel to and spaced from first plate 205. The combination of first plate 205 and second plate 206 comprises a parallel plate capacitance means 200. A low impedance path to ground is provided for the d.c. signals that might be present at output terminal 110 by radio frequency choke coil 220. Choke coil 220 is similar to aforedescribed choke coil 120 of FIG. 2. It has been noted above that the value of capacitance of a parallel plate capacitance means is proportional to the separation between the plates thereof. It is readily apparent that the apparatus of the present invention will accurately determine the capacitance of the parallel plate capacitance means 200 comprised of plates 205 and 206, and therefore, a precise measurement of the distance between plates 205 and 206 is obtainable. If desired, plates 205 and 206 may be disposed in a fluid dielectric medium to provide isolation from the ambience and to improve the sensitivity of the variable capacitance means 200 to a change in plate separation.

The operation of the further embodiment of the present invention is similar to the detailed description set forth hereinabove with respect to FIG. 2, and need only be briefly described. Initially, the balanced electric condition of the variable impedance bridge circuit may be established by affording sufficient separation between plates 205 and 206. Accordingly, the resistance of adjustable resistance means 104 is equal to the impedance of the variable capacitance means 200 and d.c. resistance measuring means 123 accurately indicates the distance between plates 205 and 206. Hence, the waveforms illustrated in FIG. 3A obtain. If the distance between plates 205 and 206 varies, the capacitance of variable capacitance means 200 varies in a proportionate manner to disturb the balanced potential condition of the variable impedance bridge circuit. Consequently, the waveforms of FIG. 3B might be produced and the integrating circuit comprised of amplifying means 118 and feedback capacitor 119 supplies adjustable resistance means 104 with a slowly varying voltage proportional to the distance between plates 205 and 206. Variable resistance means 104 responds to the slowly varying voltage supplied thereto and the voltage-dependent resistance thereof is adjusted such that the balanced potential condition of the variable impedance bridge circuit is restored. Consequently, the slowly varying voltage supplied by the integrating circuit is minimized and the resistance of adjustable resistance means 104 is adjusted to be substantially equal to the capacitive component of the impedance of variable capacitance means 200. Hence, d.c. resistance measuring means 123, if appropriately calibrated, provides a measurement of the separation between plates 205 and 206. If the relative position of plate 206 is again altered, the capacitance of variable capacitance means 200 is varied to disturb the balanced potential condition of the variable impedance bridge circuit and the waveforms of FIG. 3C might obtain. It is now clearly understood that the resistance of adjustable resistance means 104 is adjusted by the slowly varying voltage supplied thereto by the integrating circuit, and the balanced potential condition of the variable impedance bridge is restored. The value of the resistance of adjustable resistance means 104 is proportional to the separation between plates 205 and 206, and d.c. resistance measuring means 123 provides a direct measurement of such separation.

While the invention has been particularly shown and described with reference to specific embodiments thereof, it will be obvious to one skilled in the art that the foregoing and various other changes and modifications in form and details may be made without departing from the spirit and scope of the invention. For example, the integrating circuit illustrated in FIG. 2 may be replaced by a conventional differential integrator including a first inverting input coupled directly to resistance means 113 and a second non-inverting input coupled directly to resistance means 116. It is understood that in this configuration, half wave rectifying means 111 or 114 may be oppositely poled. It is, therefore, intended that the appended claims be interpreted as including all such changes and modifications.

What is claimed is:

1. In apparatus for determining the interstice between a target means and variable inductance sensing means including bridge means having a network branch including said variable inductance sensing means; means for applying an energizing signal to said bridge means; control signal generating means coupled to said bridge means for generating a control signal proportional to the deviation by said bridge means from a balanced potential condition; and target means magnetically coupled to said variable inductance sensing means and adapted to vary the impedance thereof in accordance with said interstice, thereby altering a balanced potential condition of said bridge means, the improvement comprising:

first peak detection means included in said control signal generating means comprised of positive half wave rectifying means having an input terminal connected to a first output terminal of said bridge means and an output terminal coupled to the input of a first low pass filter means;

second peak detection means included in said control signal generating means comprised of negative half wave rectifying means having an input terminal connected to a second output terminal of said bridge means and an output terminal coupled to the input of a second low pass filter means;

comparator means coupled to the outputs of said first and second low pass filter means for generating a signal proportional to the difference in magnitude between signals appearing at said outputs;

integrator means coupled to said comparator means for producing a slowly varying control signal;

adjustable resistance means included in another network branch of said bridge means, said adjustable resistance means comprising photoresistive cell means optically coupled to light emitting diode means, said diode means coupled to said integrator means and said photoresistive cell means having a resistance that is dependent upon the intensity of light received thereby such that said light emitting diode means emits light having an intensity determined by the magnitude of said control signal;

conductor means connected between said integrator means and said adjustable resistance means for applying said control signal to said adjustable resistance means for modifying the resistance thereof in accordance with said control signal to restore said bridge means to its balanced potential condition; and resistance measuring means coupled to said adjustable resistance means for measuring the resistance thereof when said bridge means is restored to its balanced potential condition, said resistance being a function of said interstice.

2. Apparatus for determining the interstice between a target means and a variable impedance sensing means comprising:

bridge means having a plurality of network branches, one of said network branches including said variable impedance sensing means and another of said network branches including adjustable resistance means;

means for applying an AC energizing signal to said bridge means;

means for isolating said network branch including said adjustable resistance means from DC signal portions which may be present in said bridge means;

control signal generating means being connected to said bridge means and responsive to signals produced when said bridge means deviates from a balanced condition for modifying the DC resistance exhibited by said adjustable resistance means to restore said bridge means to a balanced condition; and means for measuring the DC resistance exhibited by said adjustable resistance means, said measuring means being connected to said another of said network branches and isolated from AC signals which may be present therein, said DC resistance exhibited being a function of said interstice.

3. The apparatus according to claim 2 wherein said control means comprises:

first peak detection means coupled to a first output of said bridge means for producing a first signal proportional to a voltage signal appearing at said first output;

second peak detection means coupled to a second output of said bridge means for producing a second signal proportional to a voltage signal appearing at said second output;

comparator means coupled to said first and second peak detection means for generating a signal proportional to the difference in magnitude between said first and second signals; and integrator means connected to said comparator means for producing a slowly varying signal for modifying the DC resistance exhibited by said adjustable resistance means.

4. The apparatus according to claim 2 wherein said adjustable resistance means comprises photoresistive cell means optically coupled to light emissive diode means and exhibiting a DC resistance that is a function of the intensity of radiation received thereby, said light emissive diode means emitting radiation having an intensity which is determined by signals produced by said control signal generating means.

5. The apparatus according to claim 2 wherein said variable impedance sensing means comprises coil means for magnetically sensing said target means.

6. The apparatus according to claim 2 wherein said variable impedance sensing means comprises electrically conductive means adapted to form a first plate of a parallel plate capacitance means and said target means is adapted to comprise a second plate of said parallel plate capacitance means, said parallel plate capacitance means exhibiting a reactive component that varies as a function of the separation between said electrically conductive means and said target means.

7. The apparatus according to claim 2 wherein said means for applying an AC energizing signal to said bridge means acts to apply an energizing signal whose frequency is substantially equal to the resonant frequency of said variable impedance sensing means.

8. The apparatus according to claim 3 wherein said adjustable resistance means comprises photoresistive cell means optically coupled to light emissive diode means and exhibiting a DC resistance that is a function of the intensity of radiation received thereby, said light emissive diode means emitting radiation having an intensity which is determined by said slowly varying signal produced by said integrator means.

9. The apparatus according to claim 8 wherein said means for applying an AC energizing signal to said bridge means acts to apply an energizing signal whose frequency is substantially equal to the resonant frequency of said variable impedance sensing means.

10. The apparatus according to claim 9 wherein said variable impedance sensing means comprises coil means for magnetically sensing said target means.

11. The apparatus according to claim 9 wherein said variable impedance sensing means comprises electrically conductive means adaPted to form a first plate of a parallel plate capacitance means and said target means is adapted to comprise a second plate of said parallel plate capacitance means, said parallel plate capacitance means exhibiting a reactive component that varies as a function of the separation between said electrically conductive means and said target means.

* * * * *